July 16, 1940.   H. R. CRANE   2,208,017
QUICK ACTION ROD COUPLE ASSEMBLY
Filed Feb. 20, 1939
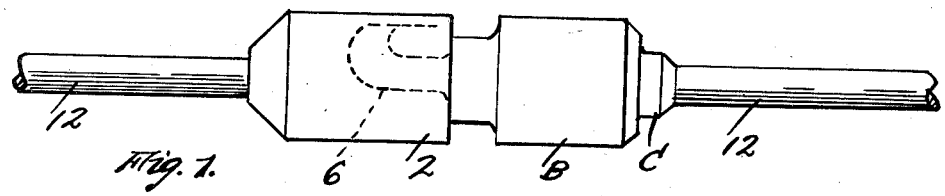
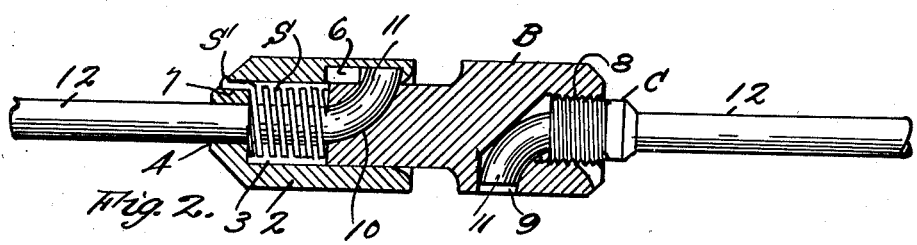
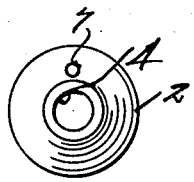
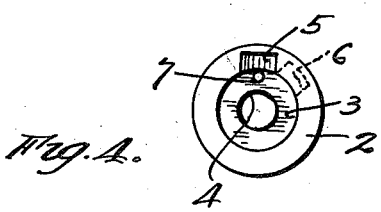
Inventor,
H. R. Crane;
By his Attorney,
Frederick E. Maynard.

Patented July 16, 1940

2,208,017

UNITED STATES PATENT OFFICE 2,208,017

QUICK ACTION ROD COUPLE ASSEMBLY

Hubert R. Crane, Los Angeles, Calif.

Application February 20, 1939, Serial No. 257,405

4 Claims. (Cl. 287—104)

This invention is a rod coupling of the class shown in Williams Patent No. 1,990,721 and in the Crane Patent No. 2,110,202.

In those patents a hook-ended steel rod is engaged in a lateral hole in a body or socket member and is held centered in such relation by a jam bushing which must be screwed in or out after the hook end has been engaged in the body.

It is desirable, often, to effect a quick connection or disconnection between ends, of a rod string, of a series of rods making up a suitable length. In the above mentioned patents it takes time to screw in or out the centering bushings or a bushing just to connect or disconnect. The present invention has for an object to provide means in the coupler assembly to enable an effective, positive co-rotative connection of near rod ends and yet to enable the connection to be instantly made up and as easily broken.

A purpose also of the invention is to provide a coupling device which may be hooked up or unhooked entirely by hand without need of a wrench or other tool as is common with the operation of the screw type fastener.

More particularly an object is to provide a simple body member with means to interlock hooked rod ends and including a device for quick attachment or detachment of a rod end as desired and to constantly exert a yieldable, axial interlocking reaction on and to center an associated rod end.

Further an object is to provide a coupler assembly including a pair of complementary, telescopic body and centering members rotatively interlockable by a relative inserted rod hook; further incorporating a yieldable, axial thrust device to releasably connect the members in combination and providing for quick make and break of the joint at the members.

The invention consists of certain improvements in this art as set forth in the ensuing disclosure and having with the above, additional objects and advantages as hereinafter developed, and whose construction, combinations and details of means, and the manner of operation will be made manifest in the description of the herewith illustrative embodiment; it being understood that modifications, variations and adaptations may be made within the scope, spirit and principle of the invention as it is more directly claimed hereinbelow.

Figure 1 is an elevational view of the closed coupling assembly joining coaxial rods.

Figure 2 is an axial section of the assembly; joining rods.

Figure 3 is an outer-end view of the quick release, rod centering, box member.

Figure 4 is a slot-face end view of the box member.

As here exhibited the assembly includes a very substantial, preferably cylindrical main body B, conventionally of hard metal having, in this example, a threaded bore end 8 large enough to axially receive a bushing or collar C which slidably but snugly receives one end portion of a rod 12, of steel or other suitable material, and which has a 90° hook end 11, usually made on the rod after the collar C has been mounted thereon. This hook is adapted to be passed into the bore end 8 and then wormed into a radial or lateral hole 9 more or less snugly fitting the rod hook. After the hook has been inserted in the hole 9 the collar C is then run into the threads of the bore 8 and the rod 12 is thereby brought and held to a coaxial relation with the body B so that the rod cannot tilt in the bore and accidentally dislodge the hook 11; this having the function of co-rotatively interconnecting the rod and the coupling body B.

It is very desirable to provide means to disconnect joined rod ends in a manner quicker than is possible by the threaded fastener just above described, and to that objective the opposite end of the body B is provided with a quarter-turn, form of lateral hole 10 leading out from the axis of the body B and of a size to fit an inserted hook 11 of one of the rods 12. This lateral aperture is closer to the near end of the rod than is the hole 9 at the other end of the body for the reason that in this instance of joint device there is no need of collar C.

Instead, there is provided a box form of rod centering member 2 having a bore 3 of a size to telescope onto the near end of the body B and laterally beyond which the radially distal end of the hook 11 of an inserted rod 12 projects to a desired degree.

The box member 2 has in its outer end a center bore hole 4 of a size to slidably and fairly snugly receive the relative rod 12 whose end is shown in Fig. 2, as lying in the body hole 10.

The inner end of the member 2 presents a mouth opening 5 to a J-slot 6 which is of a width to slidably receive the aforesaid projecting end of the hook 11 lying in the arcuate hole 10 of the body B when the box member 2 is pushed onto the body with the slot mouth in line with the relative hook end 11. By an annular partial rotation of the box member 2 on the body B the hook end 11 will be brought to position and interlock with the reverse bend of the J-slot in the large bore 3 of the member 2.

Means are provided to exert a constant tendency on the box member 2 to move outward on the body B whereby to keep the relative rod hook 11 in the bend of the J-slot 6, and yet enable the instant disengagement of the box from the hook and body at will. Therefore a suitable expansion spring S in the bore of the box 2 reacts between the near end of the body B and the outer end wall of the box 2 and allows the box to be yieldably repressed to clear the hook from the J-slot and thence of the mouth 5. The spring S is suitably hitched to the box as by prong or horn S' in a longitudinal pocket 7.

What is claimed is:

1. A rod string coupling assembly including a body, a rod having a hooked end and the body having from its axis an aperture to center the rod and receive the hook thereof, said hook extending beyond the side of the body when in place, and a member slidable and turnable on the rod and interlockable with said extending hook and being readily disengageable therefrom, for separation of the rod and member from the body.

2. The assembly of claim 1, and including means yieldably pressing the said member into such hook interlock.

3. The assembly of claim 1, the said member slidably and turnably fitting the body and passing over the hook end.

4. The assembly of claim 1, and a spring anchored in the said member and acting to yieldably maintain the interlock therewith of the hook.

HUBERT R. CRANE.